March 6, 1945.  P. P. WEICHBRODT ET AL  2,370,827
MEANS FOR FORMING THERMOPLASTIC MATERIAL
Filed Nov. 7, 1941   2 Sheets-Sheet 1
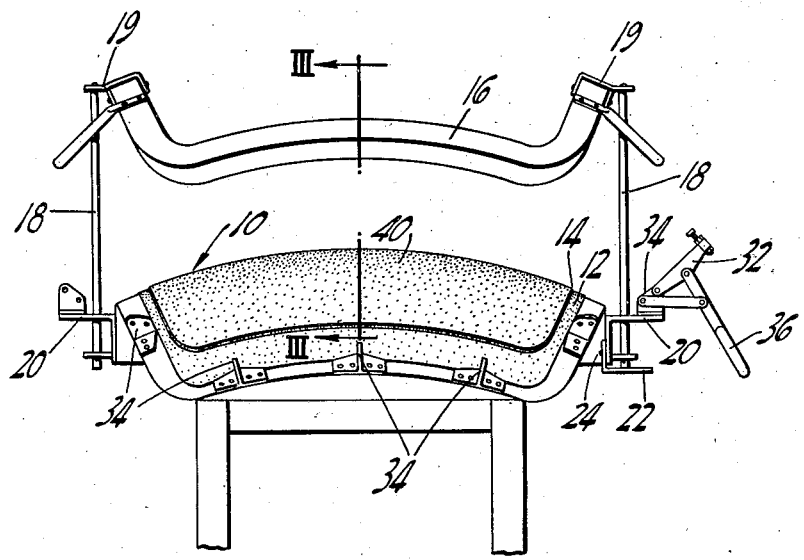
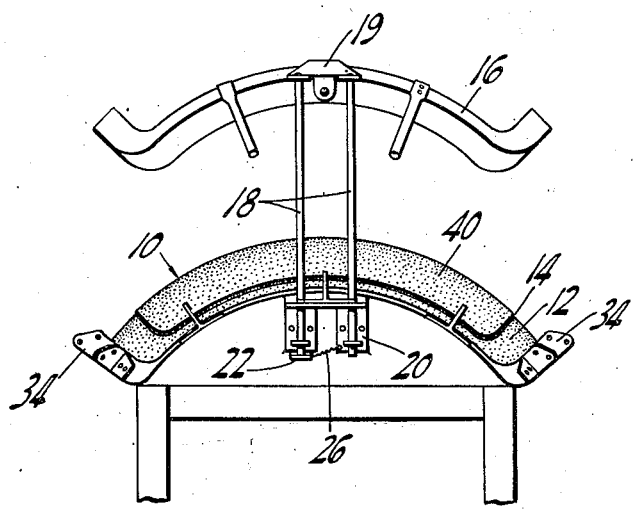
INVENTOR
Paul P. Weichbrodt &
BY Fred L. Williamson,
Beau, Brooks, Buckley & Beau.
ATTORNEYS

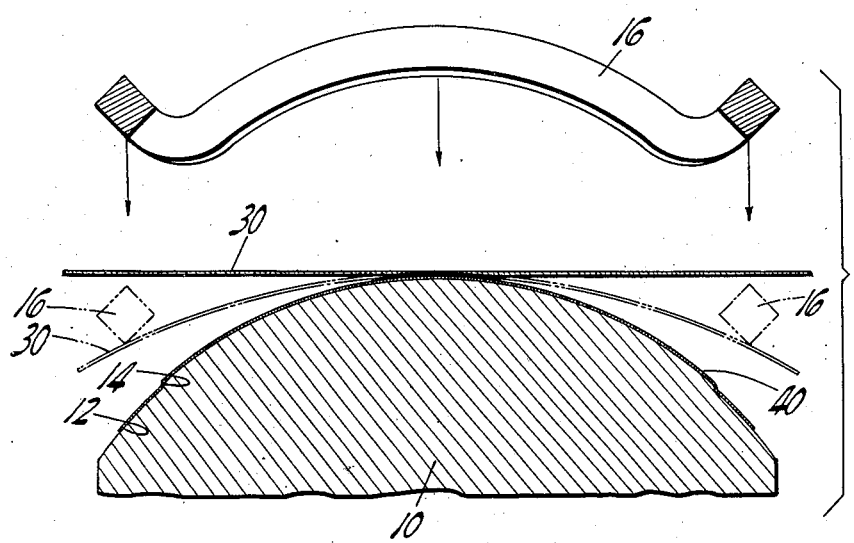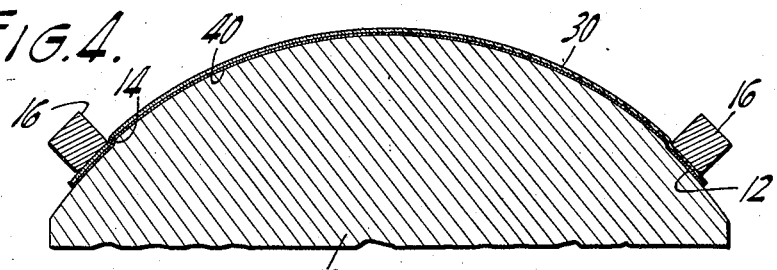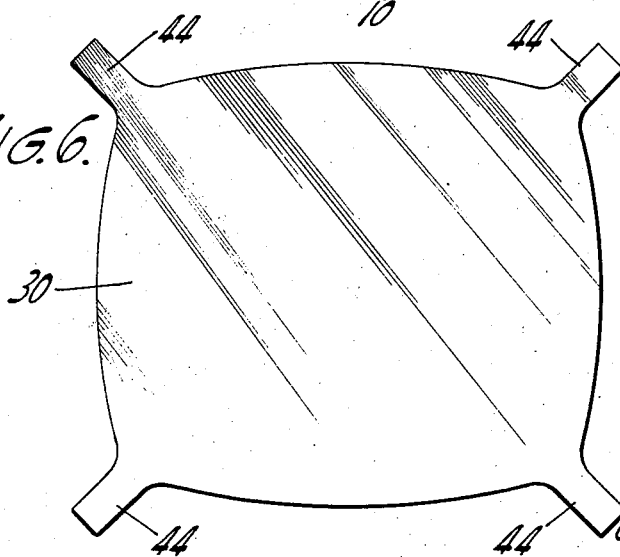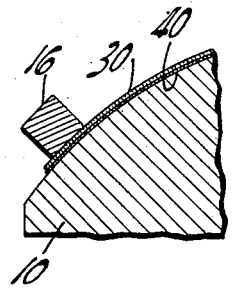

Patented Mar. 6, 1945

2,370,827

UNITED STATES PATENT OFFICE 2,370,827

MEANS FOR FORMING THERMOPLASTIC MATERIAL

Paul P. Weichbrodt, Buffalo, and Fred L. Williamson, Kenmore, N. Y., assignors to Bell Aircraft Corporation, Buffalo, N. Y.

Application November 7, 1941, Serial No. 418,160

4 Claims. (Cl. 18—19)

This invention relates to means for forming flat sheets of thermoplastic material into spherical or spheroidal or other dished shapes, and into other deformed shapes.

The invention has particular application to the manufacture of dished plates formed of thermoplastic material; such as for example, airplane cabin or cockpit canopy window panes of transparent resin or cellulose derivative materials, or the like. For this purpose synthetic thermoplastic materials have been employed for some time, and the window panes have been formed from flat sheet stock material through use of a variety of processes usually involving heating of the stock sheet to plastic state and then stretching it over a male form by pulling at opposite edges of the stock sheet so as to draw the sheet into conformity with the form. Such operations involve gripping of the stock sheets at the marginal edge portions thereof and the skilful application of stretching forces directed by the process operators manually against various portions of the stock pieces in such manner as to provide the desired finished shapes.

Thus, such prior art methods have invariably involved undesirable drawing and local distortion of the stock sheet so as to provide substantially non-uniform finished products. For example, cabin window panes produced by such methods are usually undesirably thinned at the marginal edge portions thereof where they are to be mounted in connection with the cabin enclosure framing structure. Thus, there is no assurance of a suitably strong connection in such case; and there have been instances where such window panes have blown out from connection with their frames under high speed flight conditions due to faulty connections between the window panes and the framing structures. Also, such prior art methods usually involve irregular straining of the body portion of the stock sheet such as to produce minute wrinkling effects in the material which tend to distort vision therethrough.

Therefore, it will be understood that it is of prime importance in connection with the manufacture of airplane cockpit or cabin enclosures to provide the window pane portions thereof of uniform and undiminished strength throughout and free from vision distorting wrinkles or the like, while providing the required variety of streamlined curving shapes for optimum aerodynamic performance. Also, it will be understood that it is desirable to provide the completed cockpit or cabin enclosure so as to be of outwardly smooth line form throughout the metal framing and transparent pane assembly; and that therefore the window panes will preferably be offset at their marginal edge portions so as to be adapted to be recessed within the framing structure for mounting connection therewith while the outer adjacent face portions of the window panes and the framing structure are disposed in flush relation. To this end the thermoplastic stock sheet may be deformed perimetrically to provide the required offset or joggle by pressing the stock sheet between opposing dies having proper complementing configurations. Here again, however, the drawing of the stock sheet marginal edges into offset position must be so performed as to avoid thinning or drawing of the stock sheet in the region of the offset such as would otherwise undesirably weaken the piece.

It is a primary object of the present invention to avoid the difficulties and disadvantages referred to hereinabove in connection with the prior art methods, and to provide an improved method and means for producing curved sheets of thermoplastic material which are of uniform and undiminished strength and free from distortion or wrinkling or the like so as to provide optimum vision therethrough. Another object of the invention is to provide an improved method and means for the purpose stated which is particularly suited for use in connection with large scale production operations, and whereby uniformly perfect finished articles may be turned out with utmost facility and accuracy. Another object of the invention is to provide an improved method and means for the purpose stated which will effect substantial savings with respect to the amount of labor involved. Another object of the invention is to provide a new and improved method and means for the purpose stated through use of which relatively unskilled workmen may produce uniformly perfect finished articles at a substantially increased rate of production. Other objects and advantages of the invention will appear from the specification hereinafter.

In the drawings:

Fig. 1 is a side elevation of apparatus for practicing the method of the invention, showing the stock sheet engaging elements of the apparatus in open or inoperative position;

Fig. 2 is an end elevation thereof;

Fig. 3 is a fragmentary section, on an enlarged scale, taken substantially along line III—III of Fig. 1, showing elements of the apparatus during different stages of operation thereof;

Fig. 4 is a view corresponding to Fig. 3, showing the apparatus in final stock sheet shaping position;

Fig. 5 is a fragmentary view corresponding to a portion of the view of Fig. 4 of another form of the apparatus for providing a different form of finished product; and Fig. 6 is a plan of a stock sheet piece prior to being formed in accord with the method of the invention.

The drawings illustrate the invention in connection with the manufacture of a spheroidally dished window pane for a streamlined airplane cabin or the like; that is, a cabin having its wall portions smoothly curving in all directions for optimum aerodynamic performance. Thus, it will be understood that the window pane elements thereof must likewise be continuously curving in transverse directions. The apparatus of the invention comprises primarily a male form designated at 10 which may be provided of any suitable relatively rigid substance such as metal or wood or the like. The upper surface of the form 10 is convexly shaped to complement the desired form of the concave surface of the window pane to be provided. Thus, as illustrated by Figs. 1 and 2, the form 10 will appear to be of convex sectional form when viewed both in side and end elevation. As illustrated by Figs. 1-4, the form 10 may also be perimetrically recessed as at 12 so as to provide a shoulder 14 in registry with the marginal edge portion of the finished article.

A forming collar 16 is provided in conjunction with the form 10, and is formed of metal bar material or the like and shaped so as to be adapted to encompass the shoulder portion 14 of the form 10 in closely conforming relation therearound and to register with the recessed portion 12 of the form 10 when disposed thereagainst. The collar 16 is arranged to be guided and supported so as to be in registry with the shoulder 14 and adjustable in vertical directions relative to the form 10. For this purpose posts 18 are provided to extend rigidly below the collar 16, as by means of bracket connectors 19; and the posts 18 are slidably threaded through correspondingly apertured portions of U-shaped brackets 20 extending laterally of the form 10 at opposite ends thereof. A latch 22 is pivoted to one of the brackets 20, as at 24, and is arranged to be normally urged by means of a spring 26 to move into position below the lower end portion of the corresponding post member 18 whenever the latter is raised to an elevation above the latch member. Thus, the latch member will be adapted to normally support the post collar assembly in the elevated inoperative position thereof which is illustrated by Figs. 1 and 2; but upon manual release of the latch 22 the collar-post assembly will be thereby free to be lowered into contact with the form 10 in such manner that the collar 16 will accurately register with the recessed and shoulder portions 12—14 of the form 10.

To practice the method of the invention, a flat stock piece of thermoplastic material such as is indicated at 30 (Figs. 3 to 6) is first heated in an oven or by any other suitable means to a degree sufficient to make the sheet slightly pliable and plastic. It is then carried to the forming apparatus of the drawing which is preferably located in an atmosphere having a temperature substantially lower than the plastic temperature of the stock sheet material. Thus, it will be understood that while the stock sheet is being transported to the forming apparatus the outer surface portions of the stock sheet will become slightly cooled and hardened, while the center body portion thereof remains in plastic condition. The stock sheet is thereupon disposed to lie upon the form 10, as illustrated by solid lines in Fig. 3, and the forming collar 16 is then lowered so as to bear against the stock sheet for deforming it downwardly in the direction of the form 10, as indicated by the broken line showing of Fig. 3. It will be understood that the collar 16 may in some cases be simply permitted to rest upon the stock sheet, and that the weight of the collar will be sufficient to deform the sheet into finally curved form against the form 10; or that additional downward pressures may be exerted manually against the collar 16, as the case may require.

Particular attention is directed to the fact that in accord with the method of the invention, the forming collar 16 bears directly downwardly against the stock sheet, and that during the sheet deforming process the sheet is free to draw relative to the collar 16 because of the slide bearing type of contact therebetween. Thus, no lateral stretching or pulling of the stock sheet is involved in connection with the forming process of the present invention, and it will be thereby appreciated that undesirable drawing and/or wrinkling of the sheet is thereby avoided.

To insure final driving of the collar 16 into the offset or joggle forming position relative to the shoulder 14 of the form 10, as illustrated by Fig. 4, a series of clamp devices are provided to interconnect the form 10 and the collar 16 when in approximately final relative position, and to forcibly seat the collar relative to the form 10 in uniform manner throughout the perimeter of the stock piece. Thus, as illustrated at 32 (Fig. 1), toggle clamps may be pivotally mounted upon bracket members 34 spaced perimetrically of the form 10, and so arranged as to be manually operable by means of corresponding handle members 36 to swing into clamping positions relative to the collar 16 so as to force the latter downwardly against the stock sheet behind the shoulder 14, as to the position thereof shown in Fig. 4.

The collar 16 is then permitted to reside in clamped relation so as to hold the stock sheet against the form 10 until the stock sheet is completely cooled to non-plastic state, whereupon the clamps 32 may be released and the collar 16 lifted to the position of Figs. 1 and 2. The stock sheet may then be removed from the form and the edges thereof trimmed to exactly parallel the offset shoulder which has been formed perimetrically thereof.

As illustrated in Figs. 3 and 4, the form 10 is preferably covered by means of a pad 40 of flannel or the like to avoid marring of the lower surface of the stock sheet as it is pressed against the form 10 by the collar 16. Also it is to be particularly noted that the collar member 16 is of rectangular sectional form and so formed and arranged that initial contact between the collar and the stock sheet occurs at corresponding lower corner edge portions of the collar (Fig. 3). Thus, as the collar bears downwardly against the stock sheet, and the stock sheet draws inwardly relative thereto, the contacting corner edge portion of the collar bears only against the marginal edge portion of the stock sheet which subsequently forms the offset portion thereof. Thus, any marring of the stock sheet by contact with the collar 16 will be of no consequence because such portion of the stock sheet will be subsequently covered by the framing structure upon which the finished pane is mounted.

As illustrated by Fig. 6, the stock sheet may be initially formed with extending stub portions 44 which are adapted to be grasped by the operators of the apparatus while carrying the stock sheet from the oven to the forming device; but it will be understood that the stub pieces 44 are otherwise unnecessary and will be subsequently trimmed away as excess. Also, it will be understood that a stock piece may be shaped generally as described hereinabove without providing the joggle or offset effect described hereinabove, as illustrated by Fig. 5. In either case it will be only the extreme marginal edge portion of the stock piece that will slidably contact the collar 16, and in all cases undesirable stretching or drawing or wrinkling of the stock piece will be avoided. Thus, uniformly accurate duplicate panes may be turned out consistently by the method and apparatus of the invention, as in connection with quantity airplane production operations or the like, with increased speed and great savings of labor, and through use of less skilled operators as compared to methods and means of the prior art.

Although only a limited number of forms of the invention have been shown and described in detail it will be apparent to those skilled in the art that the invention is not so limited but that various changes may be made therein without departing from the spirit of the invention or the scope of the appended claims.

What is claimed is:

1. An apparatus for forming flat sheets of thermoplastic material into dished shape, including a convex form complementing the prescribed shape of the concave face of the article to be finished and having a perimetral shoulder portion for forming an offset in said stock sheet and mounted so as to receive a flat sheet of heated plastic stock material in resting position thereon, an annular open forming collar comprising a rigid continuous frame arranged to move against said stock sheet so as to register with said shoulder and to press said sheet into conformity with said form, said collar having a leading edge portion adapted to contact said stock sheet perimetrically thereof and to bear thereagainst in free slide bearing relation at the portion of the stock disposed outwardly of the offset to be formed therein and to move directly toward said form while said stock sheet marginal portions are drawn inwardly of said collar during said dished shape forming process, said collar having a heel portion following said leading edge portion into contact with said stock sheet upon movement of the latter into finally conforming relation with respect to said form, whereby slide bearing contact effects of said collar upon said stock sheet during said forming process occur only in the region of said stock sheet disposed exteriorly of the offset shoulder formed thereon.

2. An apparatus for forming flat sheets of thermoplastic material into dished shape, including a convex form complementing the prescribed shape of the concave face of the article to be finished and disposed horizontally so as to receive a flat sheet of heated plastic stock material in resting position thereagainst, said form having a perimetral shoulder for forming a downward marginal offset in said stock sheet, an open forming collar comprising a rigid continuous frame mounted above said form and slidable vertically and arranged to move against said stock sheet under forces of gravity so as to press the stock sheet into conformity with said form, said collar having a leading edge portion adapted to contact said stock sheet perimetrically thereof and to bear thereagainst in free slide bearing relation and to move directly toward said form while said stock sheet marginal portions are drawn inwardly of said collar during said dished shape forming process and finally forced over the perimetral shoulder to stretch the stock sheet tautly over the convex form.

3. An apparatus for forming flat sheets of thermoplastic material into dished shape, including a convex form complementing the prescribed shape of the concave face of the article to be finished and having a perimetral shoulder portion for forming an offset in said stock sheet and mounted so as to receive a flat sheet of heated plastic stock material in resting position thereon, an annular forming collar arranged to move against said stock sheet so as to register with said shoulder and to press said sheet into conformity with said form, said collar having a leading edge portion being adapted to contact said stock sheet perimetrically thereof and to bear thereagainst in free slide bearing relation at the portion of the stock disposed outwardly of the offset to be formed therein and to move directly toward said form while said stock sheet marginal portions are drawn inwardly of said collar during said dished shape forming process, a plurality of detachable clamps arranged to interconnect said form and said collar when approaching final forming position for squeezing said stock sheet between said form and said collar, said collar having a heel portion following said leading edge portion into contact with said stock sheet upon movement of the latter under the action of said clamps into finally conforming relation with respect to said form, whereby slide bearing contact effects of said collar upon said stock sheet during said forming process occur only in the region of said stock sheet disposed exteriorly of the offset shoulder formed thereon.

4. An apparatus for forming flat sheets of thermoplastic material into dished shape, including a convex form complementing the prescribed shape of the concave face of the article to be finished and having a perimetral shoulder portion for forming an offset in said stock sheet and mounted so as to receive a flat sheet of heated plastic stock material in resting position thereon, an annular forming collar arranged to move against said stock sheet so as to register with said shoulder and to press said sheet into conformity with said form, said collar having a leading edge portion being adapted to contact said stock sheet perimetrically thereof and to bear thereagainst in free slide bearing relation at the portion of the stock disposed outwardly of the offset to be formed therein and to move directly toward said form while said stock sheet marginal portions are drawn inwardly of said collar during said dished shape forming process, a plurality of detachable clamps arranged to interconnect said form and said collar when the collar approaches final forming position for squeezing said stock sheet between said form and said collar.

PAUL P. WEICHBRODT.
FRED L. WILLIAMSON.